US008165393B2

(12) United States Patent
Lu et al.

(10) Patent No.: US 8,165,393 B2
(45) Date of Patent: Apr. 24, 2012

(54) HIGH DYNAMIC RANGE TEXTURE COMPRESSION

(75) Inventors: Yan Lu, Beijing (CN); Wen Sun, Anhui (CN); Feng Wu, Beijing (CN); Shipeng Li, Redmond, WA (US)

(73) Assignee: Microsoft Corp., Redmond, WA (US)

(*) Notice: Subject to any disclaimer, the term of this patent is extended or adjusted under 35 U.S.C. 154(b) by 993 days.

(21) Appl. No.: 12/133,369

(22) Filed: Jun. 5, 2008

(65) Prior Publication Data

US 2009/0304298 A1 Dec. 10, 2009

(51) Int. Cl.
*G06K 9/36* (2006.01)

(52) U.S. Cl. ........................................ 382/166; 358/521

(58) Field of Classification Search ........... 382/162–167
See application file for complete search history.

(56) References Cited

U.S. PATENT DOCUMENTS 5,054,025 A * 10/1991 Galand et al. ................. 714/800
6,560,285 B1 5/2003 Reitmeier et al.
7,305,144 B2 12/2007 Fattal et al.
7,636,496 B2 * 12/2009 Duan et al. .................... 382/274
7,853,092 B2 12/2010 Akenine-Moller et al.
2003/0227462 A1 * 12/2003 Akenine-Moller et al. .. 345/552
2005/0047675 A1 3/2005 Walmsley et al.
2005/0243177 A1 11/2005 Kang et al.
2005/0254722 A1 11/2005 Fattal et al.
2006/0002611 A1 1/2006 Mantiuk et al.
2006/0098885 A1 * 5/2006 Xu et al. ...................... 382/251
2006/0158462 A1 7/2006 Toyama et al.
2007/0014470 A1 1/2007 Sloan
2007/0076971 A1 * 4/2007 Roimela et al. ............... 382/251
2007/0133870 A1 * 6/2007 Hu ............................... 382/167
2007/0172120 A1 * 7/2007 Roimela et al. .............. 382/166
2007/0183677 A1 8/2007 Aguilar
2007/0237391 A1 * 10/2007 Wu .............................. 382/166
2007/0237404 A1 10/2007 Strom
2007/0258641 A1 11/2007 Srinivasan et al.

(Continued)

FOREIGN PATENT DOCUMENTS

WO 2007082562 A2 7/2007

(Continued)

OTHER PUBLICATIONS

Banterle, F., P. Ledda, K. Debattista, A. Chalmers, Inverse tone mapping, Proc. of the 4th Inte'l Conf. on Comp. Graphics and Interactive Techniques in Australasia and Southeast Asia, Nov. 29-Dec. 2, 2006, pp. 349-356, Kuala Lumpur, Malaysia.

(Continued)

*Primary Examiner* — Jingge Wu
(74) *Attorney, Agent, or Firm* — Lyon & Harr, LLP; Katrina A. Lyon

(57) ABSTRACT

A method for compressing a high dynamic range (HDR) texture. A first block of texels of the HDR texture in a red-green-blue (RGB) space may be transformed to a second block of texels in a luminance-chrominance space. The first block may have red values, green values and blue values. The second block may have luminance values and chrominance values. The chrominance values may be based on a sum of the red values, a sum of the green values and a sum of the blue values. The luminance values and the chrominance values may be converted to an 8-bit integer format. The luminance values may be modified to restore a local linearity property to the second block. The second block may be compressed.

17 Claims, 11 Drawing Sheets

200

ORIGINAL HDR TEXTURES (205) → ADAPTIVE COLOR TRANSFORMATION (210) → TRANSFORMED TEXTURES (215) → LOCAL HDR REDUCTION (220) → REDUCED TEXTURES (225) → JOINT CHANNEL COMPRESSION (230) → COMPRESSED HDR TEXTURES (245); REDUCED TEXTURES (225) → POINT TRANSLATION (240) → COMPRESSED HDR TEXTURES (245)

U.S. PATENT DOCUMENTS

| | | | | |
|---|---|---|---|---|
| 2007/0269104 | A1 | 11/2007 | Whitehead et al. | |
| 2007/0269115 | A1 * | 11/2007 | Wang et al. | 382/232 |
| 2007/0296730 | A1 * | 12/2007 | Lefebvre et al. | 345/582 |
| 2007/0296861 | A1 | 12/2007 | Evans et al. | |
| 2008/0002896 | A1 * | 1/2008 | Lu et al. | 382/232 |
| 2008/0019608 | A1 | 1/2008 | Zuro et al. | |
| 2008/0055331 | A1 * | 3/2008 | Iourcha et al. | 345/582 |
| 2008/0247641 | A1 | 10/2008 | Rasmusson et al. | |
| 2009/0003692 | A1 * | 1/2009 | Pettersson et al. | 382/166 |
| 2009/0322777 | A1 * | 12/2009 | Lu et al. | 345/582 |

FOREIGN PATENT DOCUMENTS

| | | | |
|---|---|---|---|
| WO | 2007-085697 | A1 | 8/2007 |

OTHER PUBLICATIONS

European Search Report for PCT/2009/048975, Sep. 7, 2011.

International Search Report and Written Opinion for PCT/2009/048975, Jan. 21, 2010.

Munkberg, J., P. Clarberg, J. Hasselgren, T. Arkenine-Möller, High dynamic range texture compression for graphics hardware, Proc. ACM Trans. Graph., Jul. 2006, pp. 698-706, vol. 25, No. 3.

Nguyen, Phong X., Office Action, U.S. Appl. No. 12/146,496, Jul. 13, 2011.

Stachera, J., P. Rokita, Fractal-based hierarchical mip-pyramid texture compression, Machine Graphics & Vision Int'l J., Feb. 2006, vol. 15, No. 3, Polish Academy of Sciences Warsaw, Poland.

Sun, W., Y. Lu, F. Wu, S. Li, DHTC: An effective DXTC-based HDR texture compression scheme, Graphics Hardware, Jun. 2008, pp. 85-94, Proc. of the Eurographics/ACM SIGGRAPH Conf. on Graphics Hardware, Sarajevo, Bosnia and Herzegovina.

International Search Report and Written Opinion for PCT/US2009/045767; issued Jan. 8, 2010.

Fattal, et al., "Gradient Domain High Dynamic Range Compression", Proceedings of the 29th annual conference on Computer graphics and interactive techniques, Date: 2002, pp. 249-256, Publisher: ACM New York, NY, USA.

Furukawa, et al., "Appearance based object modeling using texture database: Acquisition, compression and rendering", Eighth Eurographics Workshop on Virtual Environments, Date: 2002, pp. 257-266, Publisher: Eurographics Association Aire-la-Ville, Switzerland.

Holzer Bernhard, "High Dynamic Range Image Formats", Institute of Computer Graphics & Algorithms, TU Vienna, 2006, pp. 1-11.

Ström, et al., "iPACKMAN: High-Quality, Low-Complexity Texture Compression for Mobile Phones", Proceedings of the ACM SIGGRAPH/Eurographics conference on Graphics hardware, Date: 2005, pp. 1-9, Publisher: ACM New York, NY, USA.

Beers, et al., "Rendering from Compressed Textures", Proceedings of the 23rd annual conference on Computer graphics and interactive techniques, Date: 1996, pp. 1-4, Publisher: ACM New York, NY, USA.

Wang, et al., "Rendering from Compressed High Dynamic Range Textures on Programmable Graphics Hardware", Proceedings of the 2007 symposium on Interactive 3D graphics and games, Date: 2007, pp. 17-24, Publisher: ACM New York, NY, USA.

Roimela, et al., "High Dynamic Range Texture Compression", Date: Jul. 2006, ACM Transactions on Graphics, pp. 1-6, vol. 25, No. 3.

Munkberg, et al., "High Dynamic Range Texture Compression for Graphics Hardware", International Conference on Computer Graphics and Interactive Techniques, ACM SIGGRAPH 2006 Papers, Date: 2006, pp. 698-706, Publisher: ACM New York, NY, USA.

Ward, et al., "High Dynamic Range Image Encodings", Jan. 2006, pp. 1-28.

* cited by examiner

400

410

| M_idx \ T_idx | 0. | 1. | 2. | 3. | 4. | 5. | 6. | 7. | 8. | 9. | 10. | 11. | 12. | 13. | 14. | 15. |
|---|---|---|---|---|---|---|---|---|---|---|---|---|---|---|---|---|
| 0. | 1 | 1 | 1 | 1 | 2 | 2 | 2 | 2 | 4 | 4 | 4 | 4 | 8 | 8 | 8 | 8 |
| 1. | -1 | -1 | -1 | -1 | -2 | -2 | -2 | -2 | -4 | -4 | -4 | -4 | -8 | -8 | -8 | -8 |
| 2. | 2 | 3 | 4 | 5 | 4 | 6 | 8 | 10 | 8 | 12 | 16 | 20 | 16 | 24 | 32 | 40 |
| 3. | -2 | -3 | -4 | -5 | -4 | -6 | -8 | -10 | -8 | -12 | -16 | -20 | -16 | -24 | -32 | -40 |
| 4. | 3 | 5 | 7 | 9 | 6 | 10 | 14 | 18 | 12 | 20 | 28 | 36 | 24 | 40 | 56 | 72 |
| 5. | -3 | -5 | -7 | -9 | -6 | -10 | -14 | -18 | -12 | -20 | -28 | -36 | -24 | -40 | -56 | -72 |
| 6. | 4 | 7 | 10 | 13 | 8 | 14 | 20 | 26 | 16 | 28 | 40 | 52 | 32 | 56 | 80 | 104 |
| 7. | -4 | -7 | -10 | -13 | -8 | -14 | -20 | -26 | -16 | -28 | -40 | -52 | -32 | -56 | -80 | -104 |

HIGH DYNAMIC RANGE TEXTURE COMPRESSION

BACKGROUND

High dynamic range (HDR) imaging technologies have introduced a new era of recording and reproducing the real world with digital imaging. While traditional low dynamic range (LDR) images only contain device-referred pixels in a very limited color gamut, HDR images provide the real radiance values of natural scenes. HDR textures facilitate improvements in the lighting and post-processing of images, resulting in unprecedented reality in rendering digital images. Thus, supporting HDR textures has become the trend in designing both graphics hardware and application programming interfaces (APIs). However, LDR textures continue to be indispensable to efficiently support existing features of imaging technologies, such as decal maps, that do not typically require the expansive HDR resolution.

One of the challenges in using textures in imaging is that the size of textures is generally large. The LDR textures in typical 24 bit per pixel (bpp) raw red-green-blue (RGB) format typically consume too much storage and bandwidth. HDR textures, which are usually in half-floating or floating-point format in current rendering systems, can cost 2 to 4 times more space than the raw LDR textures. Large texture size constrains the number of HDR textures available for rendering a scene. Large texture size also limits the frame rate for a given memory bandwidth, especially when complicated filtering methods are used. These limits on the available textures and the frame rate constrain the quality of digital imaging in rendering a scene.

Texture compression (TC) techniques can effectively reduce the memory storage and memory bandwidth requirements in real-time rendering. For LDR textures, many compression schemes have been devised, including the de facto standard, DirectX® texture compression (DXTC), which may also be known as S3TC. DXTC has been widely supported by commodity graphics hardware.

SUMMARY

In general, one or more implementations of various technologies described herein are directed towards a method for compressing high dynamic range (HDR) textures. The HDR textures, which are represented as values in red-green-blue (RGB) channels, may be transformed onto a luminance and chrominance space. The transformation may be an adaptive process that removes the dominant RGB channel from the chrominance space. The transformed values may be quantized from floating point format to an integer format. The HDR textures in the luminance and chrominance space may be modified to accord with the standard input format of a joint color-channel compression scheme for low dynamic range (LDR) textures, such as DirectX® texture compression (DXTC). The textures may then be compressed using the joint color-channel compression.

In one implementation of compressing HDR textures, two of the RGB channels may be adaptively selected for converting to chrominance channels. The two RGB channels with the lowest values of the three RGB channels may be used in converting the RGB channels to chrominance channels. The values in the luminance and chrominance channels may be converted to an 8-bit integer format. The 8-bit integer values may be modified to restore a local linearity property that may be removed by converting the RGB channels to luminance and chrominance channels. The modified values may be compressed using DirectX® texture compression.

The modification to the textures may be stored in a new data structure, which may be used to facilitate decompression. In one implementation, the compression method may produce a data structure that can be used to render HDR images in real time using existing LDR hardware. The data structure may include some blocks in DirectX Texture formats that accommodate HDR texture data compressed according to the above method. The data structure may increase the texture compression ratio from 8 bits per pixel (bpp) to 10 bpp.

Various implementations described herein may also be directed to a method is provided for decompressing the HDR texture which have been compressed as described above. In one implementation, the compressed data may be decompressed with a new apparatus that uses the extension block along with the DirectX Texture formatted block to produce values in the RGB channels based on the original HDR textures.

Various implementations described herein may also be directed to a method for rendering HDR images in real time using existing hardware designed for real-time rendering of low dynamic range (LDR) images.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 illustrates a modifier table, according to implementations described herein.

DETAILED DESCRIPTION

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
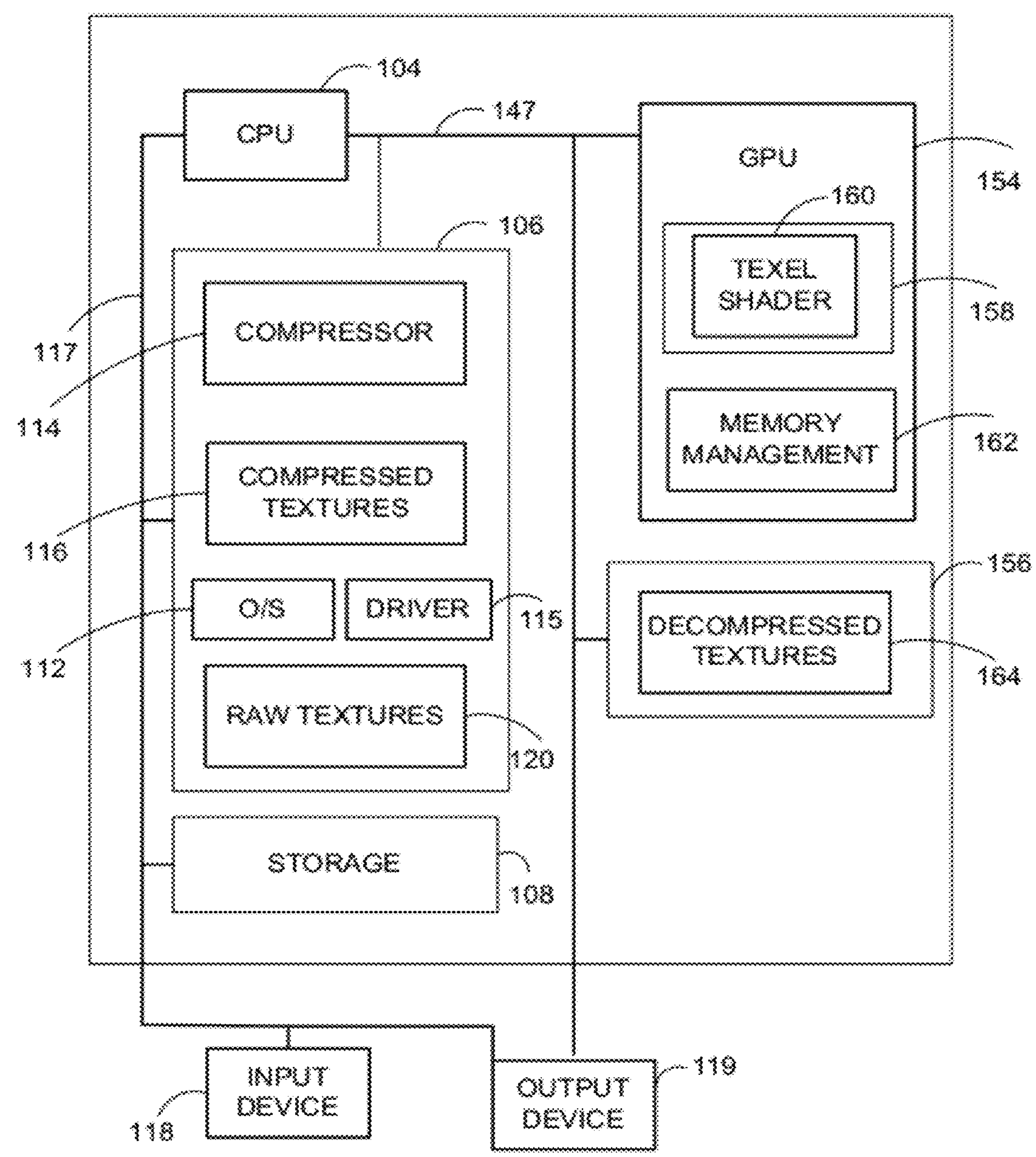
FIG. 1 illustrates a schematic diagram of a computing system in accordance with implementations described herein.

FIG. 1 illustrates a schematic diagram of a computing system 100 in accordance with implementations described herein. The computer system 100 includes a central processing unit (CPU) 104, and a system (main) memory 106, communicating via a system bus 117. User input is received from one or more user input devices 118 (e.g., keyboard, mouse) coupled to the system bus 117.

The computing system 100 may be configured to facilitate high performance processing of texel data, i.e., graphics data. For example, in addition to the system bus 117, the computing system 100 may include a separate graphics bus 147. The graphics bus 147 may be configured to facilitate communications regarding the processing of texel data. More specifically, the graphics bus 147 may handle communications between the CPU 104, graphics processing unit (GPU) 154, the system memory 106, a texture memory 156, and an output device 119.

The system bus 117 and the graphics bus 147 may be any of several types of bus structures, including a memory bus or memory controller, a peripheral bus, and a local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, PCI Express (PCIE), integrated device electronics (IDE), serial advantage technology attachment (SATA), and accelerated graphics port (AGP).

The system memory 106 may store various programs or applications, such as an operating system 112 for generating texel data in the form of raw textures 120 for display on the output device 119. Examples of operating systems 112 include a Graphical Device Interface (GDI) component of the Microsoft Windows® operating system. In one implementation, the raw textures 120 may be HDR textures, represented as 16-bit floating-point values in the RGB channels.

The system memory 106 may also store a compressor program 114. To facilitate high performance processing of texel data, the compressor program 114 may compress the raw textures 120 into compressed textures 116. Because the compressed textures 116 occupy less bandwidth on the graphics bus 147, transferring the compressed textures 116 over the graphics bus 147 may be preferable to transferring the raw textures 120 in high performance graphics processing.

In one implementation, the GPU 154 may be configured to support texel data that is compressed using a joint color-channel compression method, such as DXTC. Accordingly, the compressor program 114 may include a standard DXTC coder (not shown). As such, the compressed textures 116 may represent the raw textures 120 in a format that facilitates processing by the DXTC-configured GPU 154. The compressed textures 116 are described in greater detail in the description for FIG. 5. It should be noted that DXTC is merely used as an example of a joint color-channel compression method, and is not intended to limit implementations described herein. Other joint color-channel compression methods may be used in various implementations.

The system memory 106 may further store a driver 115 for enabling communication with the GPU 154. The driver 115 may implement one or more standard application program interfaces (APIs), such as Open Graphics Library (OpenGL) and Microsoft DirectX®, for communication with the GPU 154. By invoking appropriate API function calls, the operating system 112 may be able to instruct the driver 115 to transfer the compressed textures 116 to the GPU 154 via the graphics bus 147 and invoke various rendering functions of the GPU 154. Data transfer operations may be performed using conventional DMA (direct memory access) or other operations.

Visual output may be provided on an output device 119 (e.g., a conventional CRT, TV or LCD based monitor, projector, etc.) operating under control of the GPU 154. In one implementation, the GPU 154 may be configured to provide visual output by processing the compressed textures 162.

The GPU 154 may include various components for receiving and processing graphics system commands received via the graphics bus 147. The GPU 154 may include a display pipeline 158 and a memory management unit 162.

The display pipeline 158 may generally be used for image processing. The display pipeline 158 may contain various processing modules configured to convert the compressed textures 116 into texel data suitable for displaying on the output device 119. In one implementation, the display pipeline 158 may include a texel shader 160.

The texel shader 160 may decompress the compressed textures 116 into decompressed textures 164. In one implementation, the texel shader 160 may use a standard DXTC decoder (not shown) to decompress the compressed textures 116. As such, the decompressed textures 164 may represent texel data as 8-bit integer values in the RGB channels. The decompressed textures 164 are described in greater detail in the description for FIG. 7.

Additionally, the texel shader 160 may perform real-time image rendering, whereby the decompressed textures 164 may be configured for processing by the GPU 154. In one implementation, the texel shader 160 performs real-time HDR rendering. The texel shader 160 is described in greater detail with reference to the description of FIGS. 6-7.

The memory management unit 162 may read the compressed textures 116 from the system memory 106 to facilitate decompression by the texel shader 160. Additionally, the memory management unit 162 may read the decompressed textures 164 from a texture memory 156 to facilitate real-time rendering. The texture memory 156 may be specialized RAM (TRAM) that is designed for rapid I/O, facilitating high performance processing for the GPU 154 in rendering images, including 3-D images, from the decompressed textures 164.

The computing system 100 may further include a storage 108, which may be connected to the bus 117. Examples of storage 108 include a hard disk drive for reading from and writing to a hard disk, a magnetic disk drive for reading from and writing to a removable magnetic disk, and an optical disk drive for reading from and writing to a removable optical disk, such as a CD ROM or other optical media. The storage 108 and associated computer-readable media may provide non-volatile storage of computer-readable instructions, data structures, program modules and other data for the computing system 100.

It should be appreciated by those skilled in the art that the computing system 100 may also include other types of storage 108 and associated computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
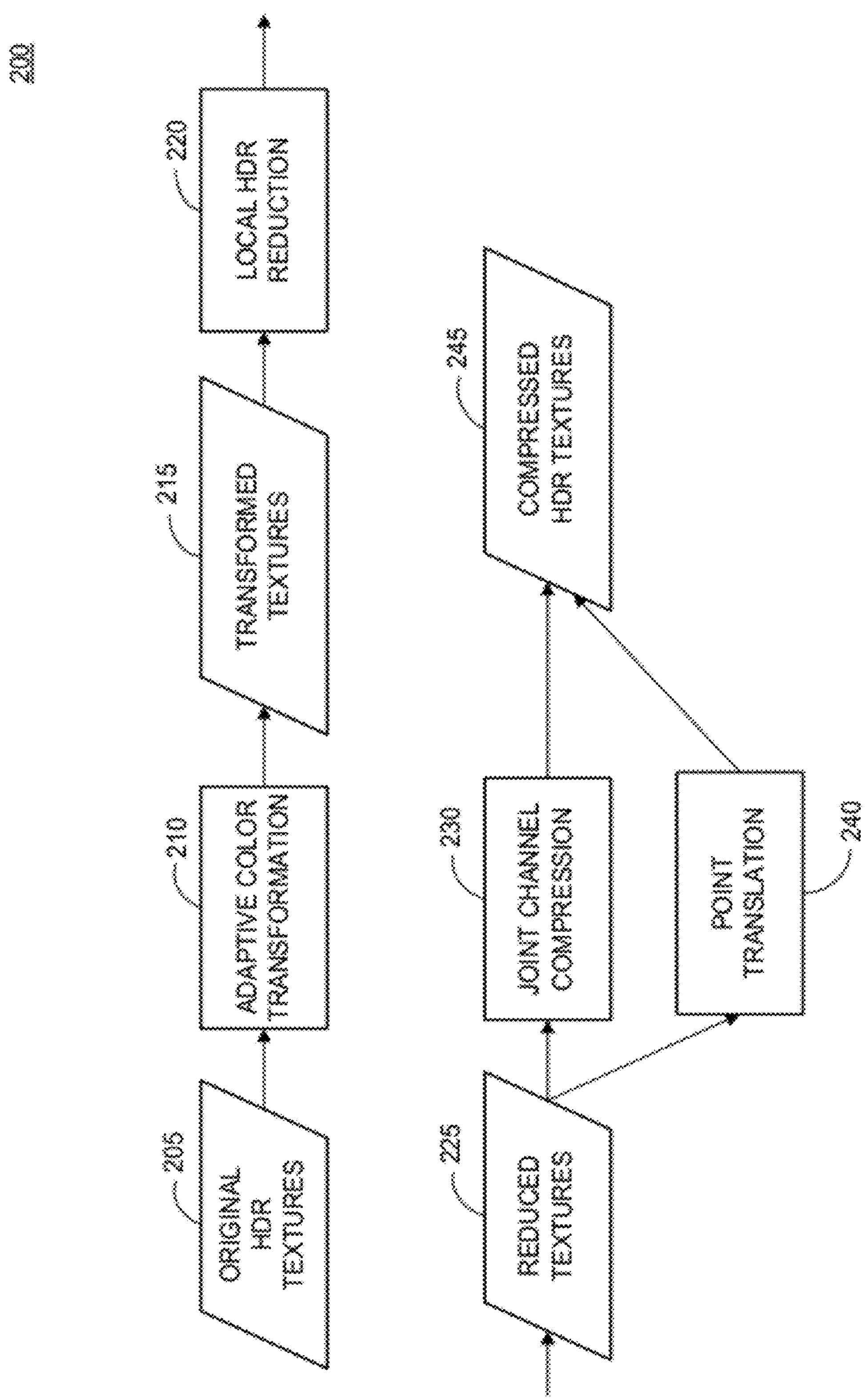
FIG. 2 illustrates a data flow diagram of a method in accordance with implementations described herein.

FIG. 2 illustrates a data flow diagram of a method 200 in accordance with implementations described herein. In one implementation, the compressor program 114 may perform the method 200. Because the raw textures 120 may be HDR textures, some pre-processing may be needed before joint color-channel compression techniques can be applied to compress the raw textures 120 into the compressed textures 116. In one implementation, the method 200 may pre-process HDR textures, and then compress the HDR textures using DXTC.

In operation, original HDR textures 205 may be input to an adaptive color transformation process 210. The original HDR textures 205 may be the raw textures 120, partitioned into 4×4 blocks of 16 texels. The adaptive color transformation process 210 may produce the transformed textures 215 by transforming the original HDR textures 205 from the RGB space to blocks of texels in a luminance-chrominance space. Herein, the luminance-chrominance space may also be referred to as a Y-UV space. In one implementation, the adaptive color transformation process 210 is based on HDR color transformation, which may include converting RGB values to Y-UV values.

Typically, HDR color transformation is determined as follows:

$$Y = \sum_{t \in \{r,g,b\}} w_t C_t$$

$$S_t = \frac{w_t C_t}{Y}, \text{ for } t \in \{r, g, b\}$$

Here, Y is the luminance channel, and $S_t$ are chrominance channels corresponding to R, G, and B. $w_t$ are constant weights. It should be noted that only two of the chrominance channels need to be determined for color transformation because the third channel may be derived based on the values of the other two chrominance channels. For example, each of the R, G, and B values may derived as follows:

$$R = S_r \times Y / w_r$$

$$G = S_g \times Y / w_g$$

$$B = (Y - w_r R - w_g G) / w_b$$

However, if the third channel is not encoded during compression, in this case, the blue channel may accumulate errors, which can be relatively large. The amount of accumulated error can be controlled, however, by adaptively selecting which channel to leave out of the color transformation. As such, an error accumulative channel may be determined from one of the R, G, and B channels. In one implementation, the error accumulation channel, also referred to herein as Ch_mode, may be derived for each texel, calculated as:

$$\text{Ch\_mode} \equiv m = \underset{t \in \{r,g,b\}}{\operatorname{argmax}} \{S_t\}$$

Here, the dominant chrominance channel may not be included in the color transformation, and accordingly not encoded in the compressed textures 120. By leaving the highest, or dominant, chrominance value out of the transformation, the relative error may be controlled because the values of the two encoded chrominance channels may fall in the range of [0, 0.5]. In one implementation, the error accumulation channel may be determined per-block instead of per-texel. In such an implementation, the color values for each texel may be summed by channel, providing a total sum for the block for each of the three channels: R, G, and B. In other words, the two channels with the lowest total sums for the block may be selected for color transformation.

Figure 3A:
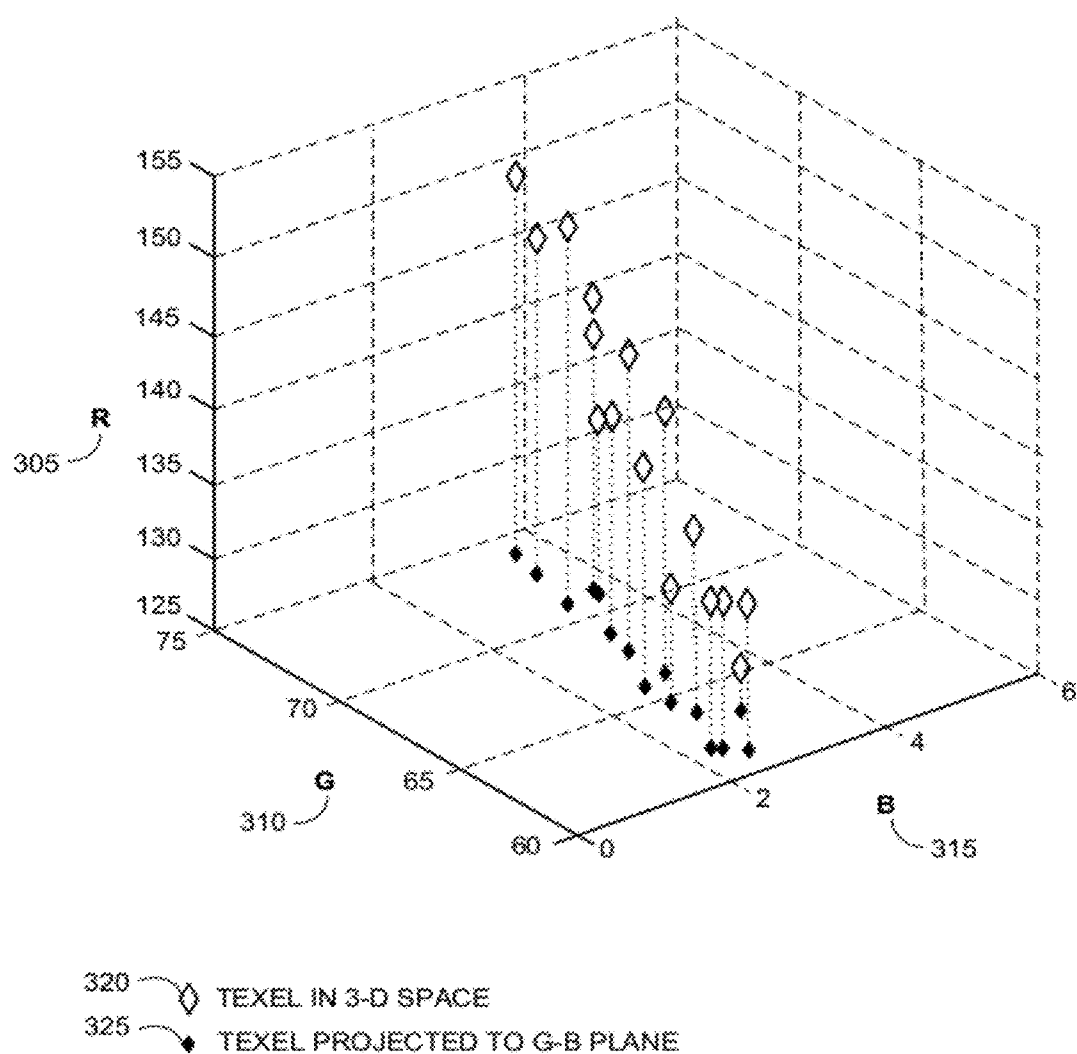
FIGS. 3A-3D illustrate graphs of texels according to implementations described herein
Figure 3B:
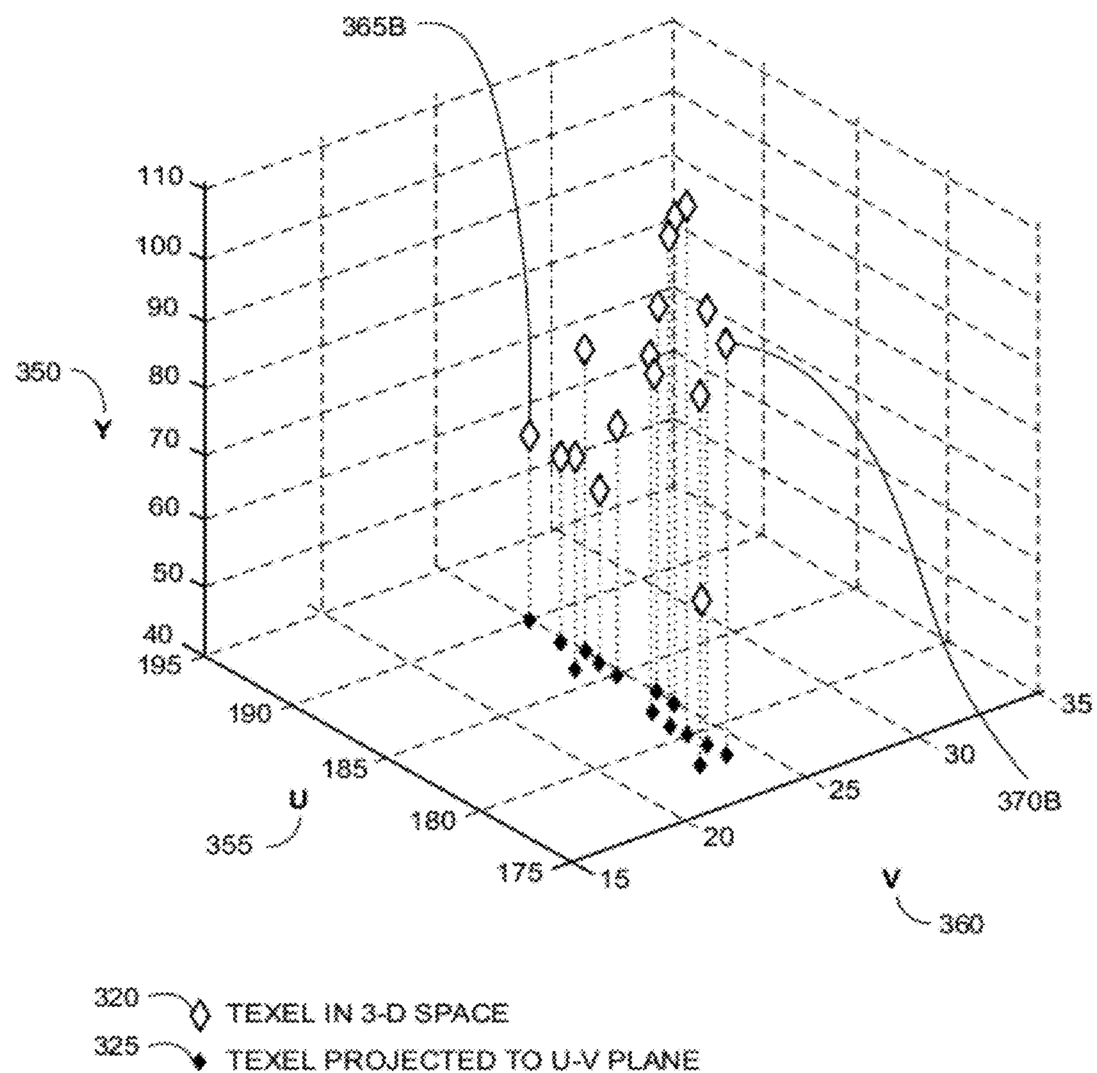

FIGS. 3A and 3B illustrate graphs of texels according to implementations of various technologies described herein. More specifically, FIGS. 3A and 3B graphically illustrate the adaptive color transformation process 210. FIG. 3A illustrates a 3-dimension Cartesian coordinate system with an R-axis 305, a G-axis 310, and a B-axis 315. Each texel in one 4×4 block of the original HDR textures 205 is represented as a diamond 320. The position in the RGB space is determined by the values of each of the R, G, and B components of the texels. The projection to the UV-plane 325 is provided to illustrate the R-positioning of each texel.

FIG. 3B illustrates a 3-dimension Cartesian coordinate system with a Y-axis 350, a U-axis 355, and a V-axis 360. Each texel in one 4×4 block of the original HDR textures 205 is transformed in the Y-UV space. The position of each texel in the Y-UV space is determined by the values of each of the Y, U, and V components of the texels as determined by the formulas described above. Because the transformation is adaptive, the U and V values may represent any two of the original R, G, and B values depending on the Ch_mode determined as described above.

Returning to FIG. 2, the transformed textures 215 may be input to a local HDR reduction process 220. The transformed textures 215 may represent the luminance and chrominance values (the Y-UV values) in 16-bit floating-point format, which typically is more difficult to compress than integer values. Accordingly, the local HDR reduction process 220 may convert the 16-bit floating point Y-UV values to an 8-bit integer format. The values in 8-bit integer format may be included in reduced textures 225.

To convert the Y values to 8-bit integers, a global luminance range may be determined. The global luminance range may be the upper and lower bound of values in the Y channel for all the texels in the block. The upper bound may be derived from 5-bit quantizing and rounding up the maximal luminance value to the nearest integer. The lower bound may be derived from 5-bit quantizing and rounding down to the nearest integer. Each of the 16-bit floating point Y values may then be mapped into relative values within the global luminance range. The relative Y-values may then be quantized using linear quantization in log 2 space.

To convert the UV values to 8-bit integers, linear encoding and log encoding may be alternatively employed for each 4×4 block of texels. The values of chrominance channels UV generally fall into [0, 1], and thus may be directly quantized into 256 levels in [0, 1], i.e. 8-bit integer values.

The reduced textures 225 may represent each of the Y-UV values as 8-bit integers for each texel in a 4×4 block. Additionally, the reduced textures 225 may include the global luminance range values (upper and lower bound luminance values in 5-bit integer format). The reduced textures 225 may be input to a joint channel compression process 230 and a point translation process 240, which collectively produce the compressed HDR textures 245.

DXTC is typically applied to raw LDR textures that are represented as Y-UV channel values in 8-bit integer format. As such, the joint channel compression process 230 may apply DXTC to the reduced textures 225. However, applying DXTC directly to the reduced textures 225 may produce large distortions because the adaptive color transformation process 210 and the local HDR reduction process 220 may remove a local linearity property in the Y-UV color spaces that is relied upon by DXTC. As such, the local linearity property is restored by the point translation process 240 before employing DXTC in the joint channel compression process 230. DXTC may further compress the 8-bit Y-UV values to produce the compressed HDR textures 245.

The point translation process 240 may reshape distribution of each block of reduced textures 225 in the Y-UV space such that the local linearity property may be restored. In doing so, the point translation process 240 may shift the texels in the Y-UV space such that each point is positioned close to a single line segment in the Y-UV space. In one implementation, each texel is shifted solely along the Y-axis. In another implementation, a modifier table may be used to determine a re-distribution of each block of the reduced textures 225.

FIG. 4 illustrates a modifier table 400 according to implementations of various technologies described herein. The modifier table 400 includes a list of values along T_idx 410 columns and M_idx 420 rows. The modifier values in the table may be calculated as follows:

$$\text{modifier}=(-1)^{(M\_idx\&1)}\times 2^{(T\_idx>>2)}\times[1+(T\_idx\&3+1)\times(M\_idx>>1)]$$

For example, the Y-values in each block of the reduced textures 225 may be modified according to the following formula:

$$Y_{trans}=Y_{int}+\text{modifier}$$

Modifier values may be selected according to which values attenuate the reconstruction error. More specifically, for each block, all possible T_idx 410 values [0, 1, . . . , 15] are enumerated. Then, for each T_idx 410, the M_idx 420 value that provides the minimal reconstruction error for each texel is determined. Finally, the per-block T_idx 410 and per-texel M_idx 420 are selected to minimize the overall block reconstruction error. Once the texels in the block have been translated as described above, the DXTC process can be applied in the joint-channel compression process 230.

Figure 3C:
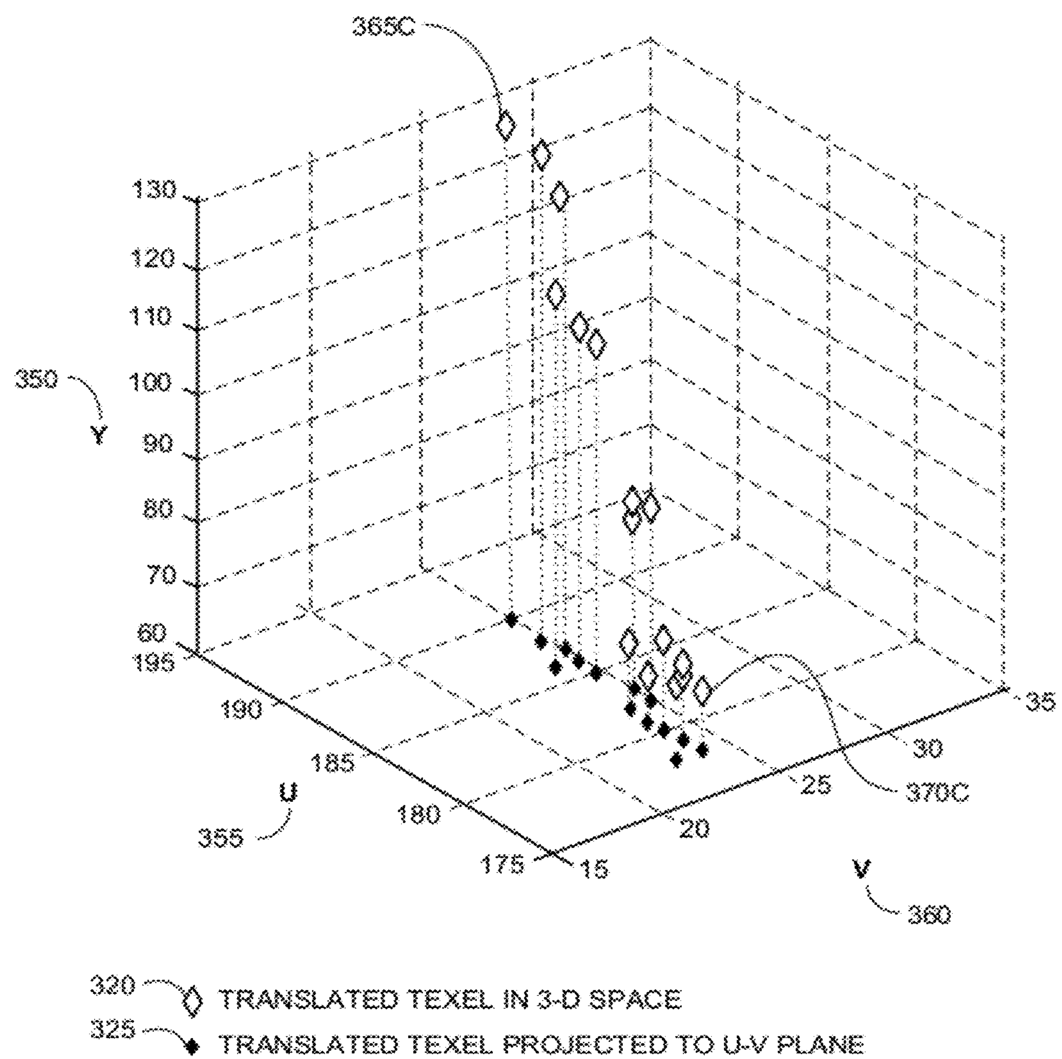

FIGS. 3B and 3C illustrate graphically the point translation process 240. In FIG. 3B, two texel points, 365B and 370B, are noted. FIG. 3C illustrates the same texels after point translation. More specifically, the texel points 365C and 370C illustrate a translation along the Y-axis, whereby point 365C has a greater Y-value than 365B, and point 370C has a lower Y-value than point 370B.

Figure 3D:
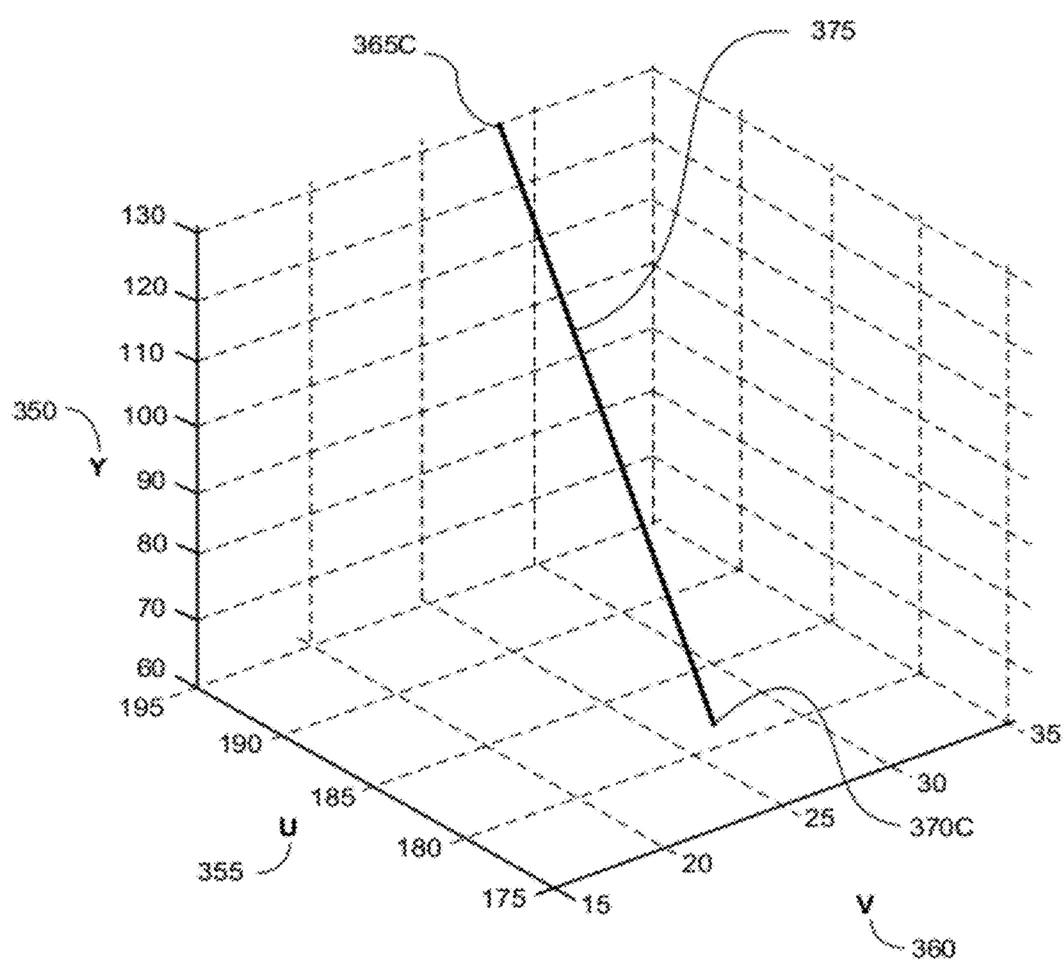

FIG. 3D illustrates a line segment 375 that is approximated by the point-translated texels in FIG. 3C, where points 365C and 370C represent endpoints of the line segment 375. It should be noted however, in implementations described herein, the translated texel points may only approximate endpoints of the line segment 375, and not represent actual endpoints.

Figure 5:
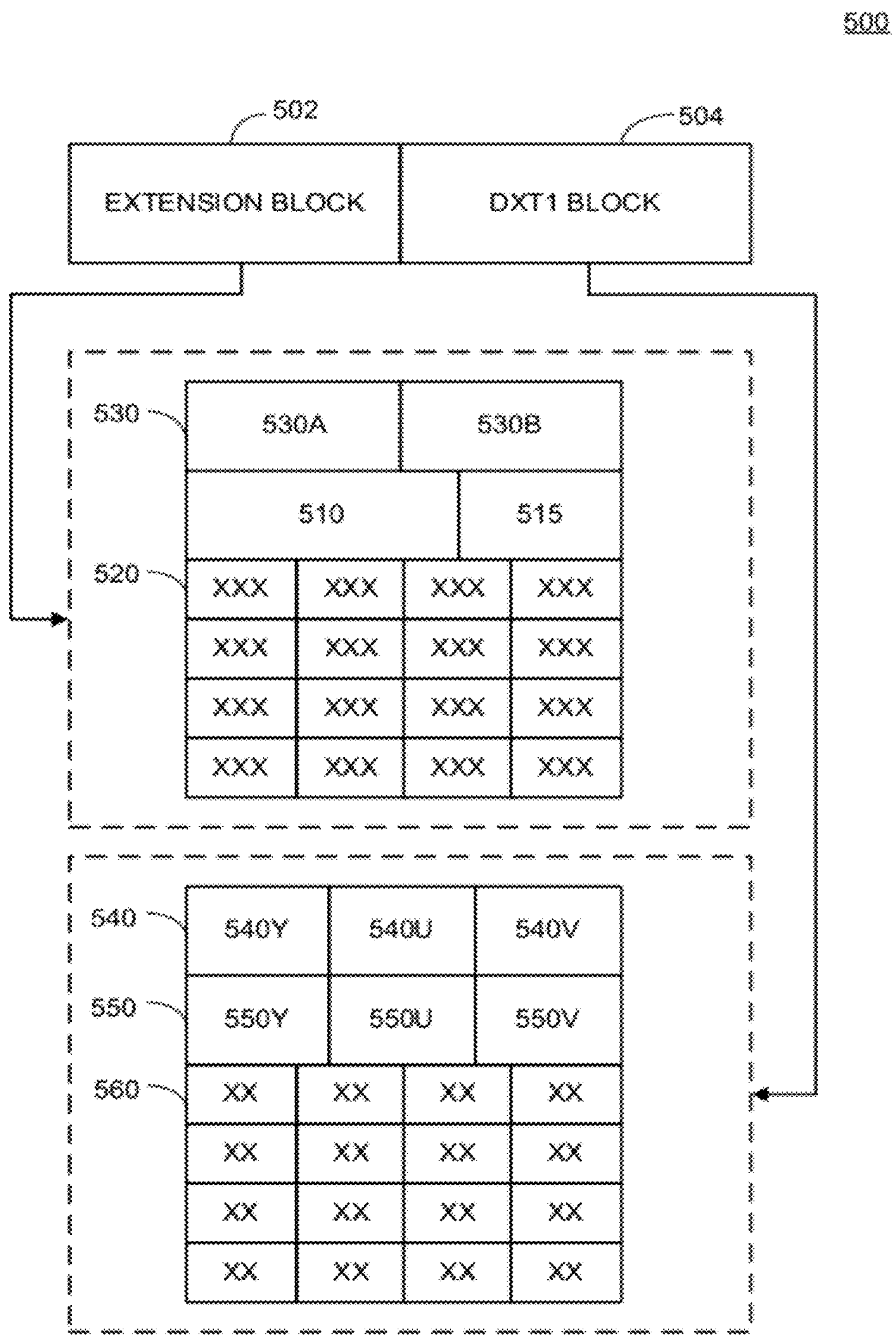
FIG. 5 illustrates a data structure in accordance with implementations described herein.

FIG. 5 illustrates a data structure 500 in accordance with implementations of various technologies described herein. The data structure 500 may represent a format of the data in the compressed textures 116. The data structure 500 may include a DXT1 block 504 and an extension block 502. The DXT1 block 504 may represent a standard data structure format used in DXTC.

DXT1 block 504 may include base color 540 and base color 550. Each base color is represented as Y, U, and V values. Accordingly, base color 540 may include 540Y, 540U, and 540V. Similarly, base color 550 may include 550Y, 550U, and 550V. Base color 540 and base color 550 may represent the values of endpoints of the line segment 375 approximated by the point-translated texels in one block. Color indices 560 represent a value in the Y-UV space for each texel based on a DXTC algorithm.

The extension block 502 may include data that facilitates decompression and rendering by the texel shader 160. The extension block 502 may include data values that represent changes to the original HDR textures 205 introduced by the pre-processing performed prior to the DXTC.

More specifically, the Ch_mode 515 may represent the R, G, or B channel that was not included in the adaptive color transformation process 210. The global luminance range 530 includes the upper bound 530A and lower bound 530B of the luminance values (Y-values) for each block. As previously stated, during the joint channel compression process 220, the luminance values for each texel were converted to relative values within the global luminance range 530. Also, the T_idx 510 and M_idx 520 values indicate the modifier values used in the point translation process 240. One T_idx 510 may be recorded for each block, and one M_idx 520 value may be recorded for each texel. In one implementation, a log/linear UV encoding flag value may be embedded in the mutual order of 530A and 530B.

Figure 6:
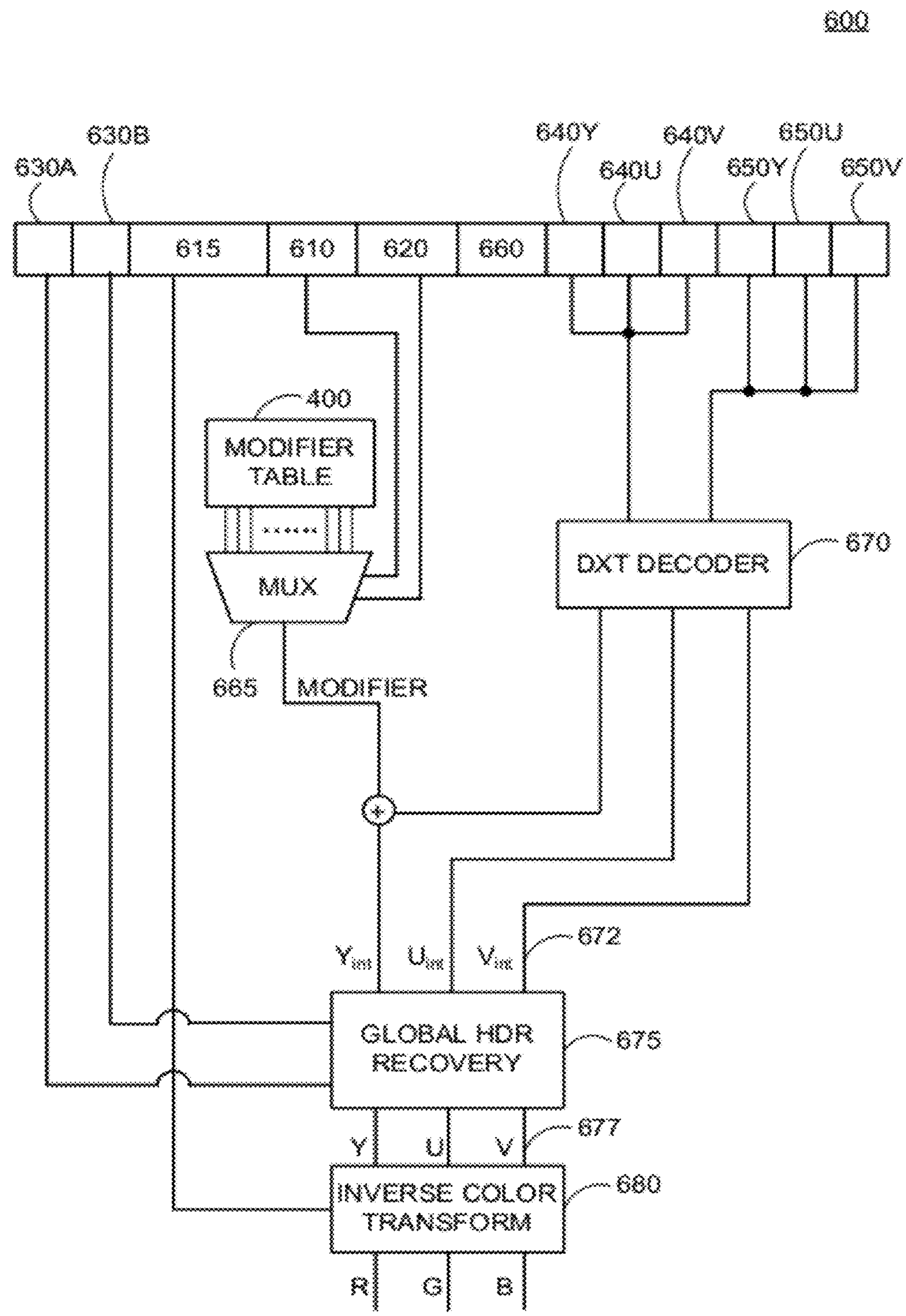
FIG. 6 illustrates decoding logic, according to implementations described herein.

FIG. 6 illustrates a decoding logic according to implementations of various technologies described herein. The decoding logic 600 illustrated in FIG. 6 may be executed for each texel represented in the compressed textures 116 stored in the data structure 500. In one implementation, the decoding logic 600 may be incorporated as part of a hardware implementation of the texel shader 160. The DXT1 block 504 may be input to a DXT decoder 670, and the 8-bit integer values of the three Y-UV channels may be recovered by decoding the C_idx value 660, base color value 540 and base color value 550.

The T_idx 610 and M_idx 620 may be used to look up the modifier value in the modifier table 400. The modifier value may then be added to the Y-value determined by the DXT decoder 670. Modifying the Y-value may compensate for the modification to the Y-values of the texels in the point translation process 240.

The global HDR recovery module 675 may perform the inverse process of the local HDR reduction process 220, including luminance log decoding and chrominance log or linear decoding. It should be noted that log decoding is a combination of linear decoding and exp2 operation. The global HDR recovery module 675 may use the global luminance range 630A, 630B to determine absolute Y, U, and, V values 677 based on the relative Y, U, and V values 672 input to the module 675.

The inverse color transform module 680 may perform the inverse process of the adaptive color transformation process 210. The Ch_mode 615 may identify the R, G, or B value left out of the adaptive color transformation process 210. By identifying the Ch_mode 615, the inverse color transform module 680 may determine R, G, and B values based on the Y-UV values output by the global HDR recovery module 675.

Advantageously, a decoder for the data structure 500 may be implemented with moderate extension of standard DXT decoder hardware. The inverse color transform module 680 may involve one addition, two tri-channel multiplications, and a MUX to reorder signals based on the Ch_mode 615. Additionally, the global HDR recovery module 675 may include one tri-channel uniform dequantization and one tri-channel exponentiation operation.

As an alternative to decompression, the texel shader 160 may perform real-time rendering using the compressed textures 116. Advantageously, real-time HDR rendering may be performed with the compressed textures 116 in the data structure format 500 without modifications to existing GPU hardware.

Figure 7:
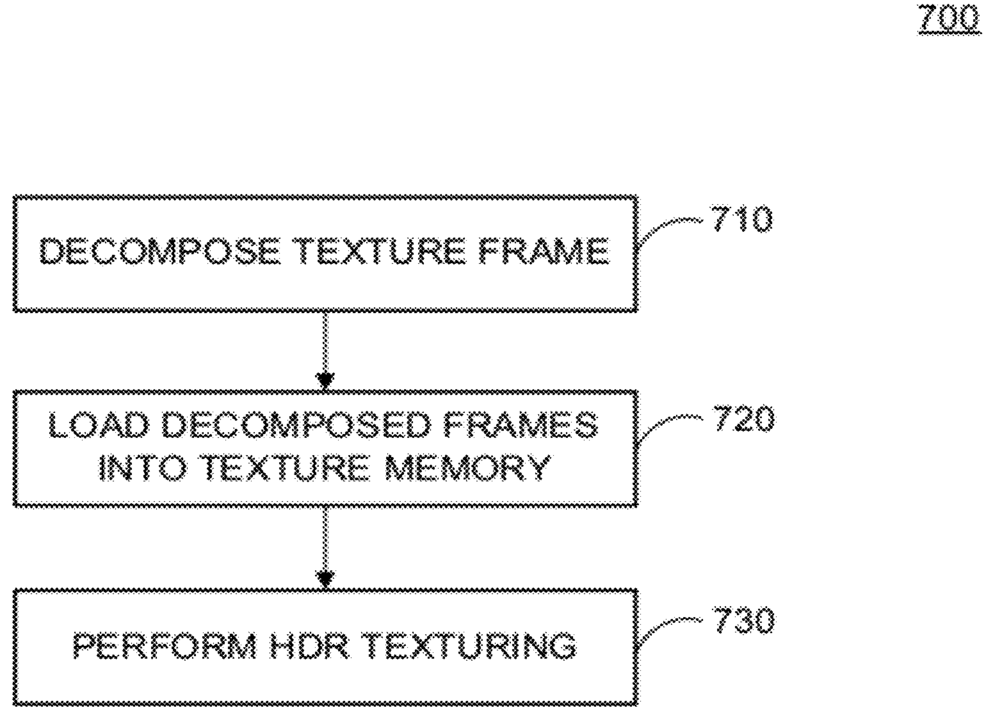
FIG. 7 illustrates a method according to implementations described herein.

FIG. 7 illustrates a method 700 for real-time rendering according to implementations of various technologies described herein. At step 710, the compressed textures 116 for one block may be decomposed into 3 direct draw surface (DDS) texture frames. The DDS texture frames are described in greater detail in FIG. 8.

At step 720, the 3 DDS texture frames are loaded into the texture memory 156. At step 730, the texel shader 160 may perform HDR texturing. When an HDR texel is used by the GPU 154, the texel shader 160 may sample all 3 DDS frames using texture coordinates determined by the nearest point sampling algorithm. The texel shader 160 may then simulate the hardware decoding process described in FIG. 6 to recover the desired texel value.

Figure 8:
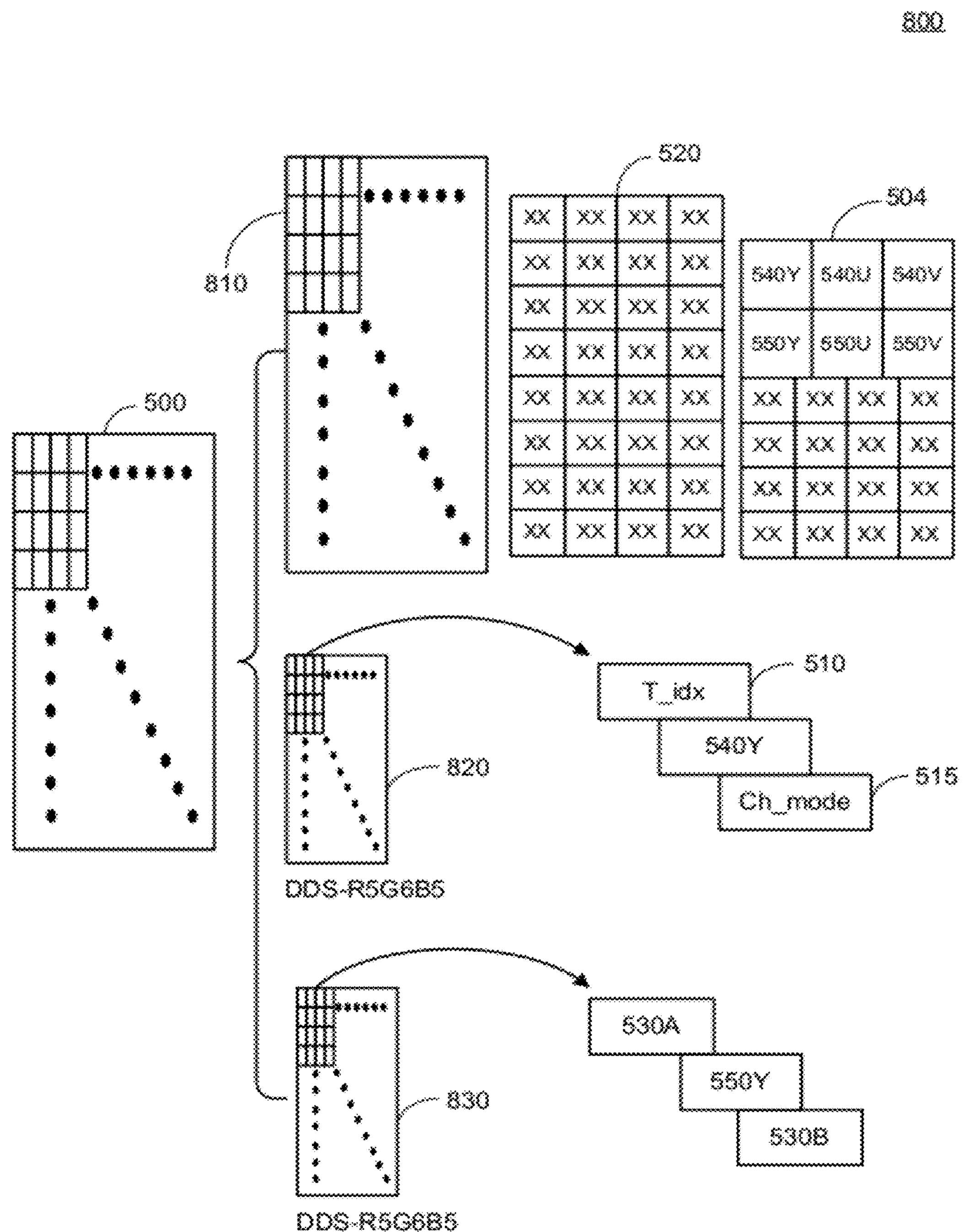
FIG. 8 illustrates direct draw surface (DDS) texture frames according to implementations described herein.

FIG. 8 illustrates DDS texture frame 810, DDS texture frame 820, and DDS texture frame 830 according to implementations of various technologies described herein. The DDS texture frames may all be derived from data included in the data structure 500 described in FIG. 5. The DDS texture frame 810 may include the M_idx 520 values and the DXT1 block 504 described in FIG. 5.

In one implementation, the DDS texture frame 820 and DDS texture frame 830 may be used to store per-block components with 1/16 down-sampled resolution. The DDS texture frame 820 may include the T_idx 510, the base color Y value 540Y, and the Ch_mode 515. The DDS texture frame 830 may include the lower bound 530A and upper bound 530B luminance values, and the base color Y value 550Y.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for compressing a high dynamic range (HDR) texture, comprising:

transforming a first block of texels of the HDR texture in a red-green-blue (RGB) space to a second block of texels in a luminance-chrominance space, the first block having red values, green values and blue values and the second block having luminance values and chrominance values, the chrominance values being based on a sum of the red values, a sum of the green values and a sum of the blue values, wherein transforming the first block of texels comprises:

selecting channels from the RGB space corresponding to two lowest sums of the sum of the red values, the sum of the green values and the sum of the blue values; and determining the chrominance values based on the RGB values of the selected channels;

converting the luminance values and the chrominance values to an 8-bit integer format;

modifying the luminance values to restore a local linearity property to the second block; and compressing the second block.

2. The method of claim 1, wherein converting the luminance values and the chrominance values comprises:

determining a range of the luminance values;

determining relative luminance values based on the range of the luminance values;

quantizing the relative luminance values to the 8-bit integer format; and quantizing the chrominance values to the 8-bit integer format.

3. The method of claim 2, wherein determining the range of the luminance values comprises determining an upper bound and a lower bound of the luminance values.

4. The method of claim 3, further comprising quantizing the upper bound and the lower bound to a 5-bit integer format.

5. The method of claim 1, wherein modifying the luminance values to restore the local linearity property to the second block comprises shifting the texels of the second block in the luminance-chrominance space such that each texel is positioned close to a single line segment in the luminance-chrominance space.

6. The method of claim 5, further comprising modifying the chrominance values to restore the local linearity property.

7. The method of claim 6, wherein compressing the second block comprises using a joint color-channel compression method.

8. The method of claim 7, wherein the joint color-channel compression method is DirectX® texture compression.

9. The method of claim 5, wherein compressing the second block comprises using a joint color-channel compression method.

10. The method of claim 9, wherein the joint color-channel compression method is DirectX® texture compression.

11. The method of claim 1, wherein modifying the luminance values to restore the local linearity property to the second block comprises positioning each texel close to a single line segment in the luminance-chrominance space.

12. A computer-readable storage device having stored thereon computer-executable instructions which, when executed by a computer, cause the computer to:

transform a first block of texels of an HDR texture in a red-green-blue (RGB) space to a second block of texels in a luminance-chrominance space, the first block having red values, green values and blue values and the second block having luminance values and chrominance values, the chrominance values being based on a sum of the red values, a sum of the green values and a sum of the blue values, wherein the instructions to transform the first block of texels further comprise instructions to:

select channels from the RGB space corresponding to two lowest sums of the sum of the red values, the sum of the green values and the sum of the blue values, determine the chrominance values based on the RGB values of the selected channels;

convert the luminance values and the chrominance values to an 8-bit integer format;

modify the luminance values to restore a local linearity property to the second block; and compress the second block using a joint color-channel compression method.

13. The computer-readable storage device of claim 12, wherein the joint color-channel compression method is DirectX® texture compression.

14. The computer-readable storage device of claim 12, further comprising computer-executable instructions which, when executed by a computer, cause the computer to:

determine a range of the luminance values;

determine relative luminance values based on the range of the luminance values;

quantize the relative luminance values to the 8-bit integer format; and quantize the chrominance values to the 8-bit integer format.

15. The computer-readable storage device of claim 12, further comprising computer-executable instructions which, when executed by a computer, cause the computer to:

determine an upper bound and a lower bound of the luminance values; and quantize the upper bound and the lower bound to a 5-bit integer format.

16. The computer-readable storage device of claim 12, further comprising computer-executable instructions which, when executed by a computer, cause the computer to:

shift the texels of the second block in the luminance-chrominance space such that each texel is positioned close to a single line segment in the luminance-chrominance space.

17. A computer system, comprising:

a processor; and a memory comprising program instructions executable by the processor to:

transform a first block of texels of an HDR texture in a red-green-blue (RGB) space to a second block of texels in a luminance-chrominance space, the first block having red values, green values and blue values and the second block having luminance values and chrominance values, the chrominance values being based on a sum of the red values, a sum of the green values and a sum of the blue values, wherein the memory comprising program instructions executable by the processor to transform the first block of texels of the HDR texture in the RGB space to the second block of texels in a luminance-chrominance space further comprises computer-executable instructions executable by the processor to:

select channels from the RGB space corresponding to two lowest sums of the sum of the red values, the sum of the green values and the sum of the blue values; and determine the chrominance values based on the RGB values of the selected channels;

determine a range of the luminance values;

determine relative luminance values based on the range of the luminance values;

quantize the relative luminance values to an 8-bit integer format;

quantize the chrominance values to the 8-bit integer format;

shift the texels of the second block in the luminance-chrominance space such that each texel is positioned close to a single line segment in the luminance-chrominance space; and compress the second block using DirectX® texture compression.

* * * * *